Nov. 24, 1925.

E. BURROUGH 1,563,157

MACHINE FOR UNREELING AND SPOOLING TYPEWRITER RIBBONS

Filed May 1, 1925

INVENTOR

Eber Burrough

BY

Busser and Harding

ATTORNEYS.

WITNESS:

Patented Nov. 24, 1925.

1,563,157

UNITED STATES PATENT OFFICE.

EBER BURROUGH, OF CAMDEN, NEW JERSEY.

MACHINE FOR UNREELING AND SPOOLING TYPEWRITER RIBBONS.

Application filed May 1, 1925. Serial No. 27,135.

*To all whom it may concern:*

Be it known that I, EBER BURROUGH, a citizen of the United States, residing at Camden, county of Camden, and State of New Jersey, have invented a new and useful Improvement in Machines for Unreeling and Spooling Typewriter Ribbons, of which the following is a full, clear, and exact description, reference being had to the accompanying drawings, which form a part of this specification.

The object of my invention is to provide a machine for unreeling ribbon from a large diameter reel of ribbon onto a spool intended to receive a relatively small length of ribbon, so that a number of spools may be supplied from the same reel. The invention is particularly adapted to the winding of typewriter ribbons onto the spools which are removably attached to typewriting machines. The users of such machines are thus able to buy large reels of ribbon, and from time to time to transfer, from one of said reels to each of a number of typewriter ribbon spools, the length of ribbon required for each spool.

Specific objects of the invention are: to provide an apparatus of maximum simplicity of construction and operation; to automatically position and hold the reel and the receiving spool in working positions by the mere folding of a two-part frame which is adapted to be held in one hand during the unreeling and spool-winding operation; and to provide a simple adjusting means to insure the proper feeding of the ribbon to receiving spools of different constructions.

A preferred embodiment of the invention is shown in the accompanying drawings, in which—

Secured to a block $a$ is a forwardly extending flat bar $b$ and a rearwardly extending flat bar $c$. Secured between the rear end of bar $c$ and the central part of a crossbar $d$ is a thin flexible plate $i$ carrying a spool-holding pin $j$.

Opposite ends of crossbar $d$ are flanged and extending between these flanged ends is a shaft $e$ on which is adapted to swing a crossbar $f$ having end flanges through which shaft $e$ extends. Secured to crossbar $f$ is a forwardly extending plate $g$ and flat bar $h$, whose front end extends, preferably, beyond the front end of bar $b$. Secured to crossbar $f$ is the rear end of a forwardly extending thin flexible tongue $k$, whose forward end is adapted to engage a spool $x$ on the holder $j$. The pressure of the tongue $k$ on spool $x$ may be regulated by a thumb screw $q$.

In accordance with the foregoing description, the parts $a$, $b$, $c$ and $d$ constitute one frame, and parts $f$, $g$, and $h$ constitute another frame which is in hinged relation to the first frame.

On the spool $x$ is adapted to be held a reel of typewriter ribbon, whose length is multiple (say twelve) times the length of ribbon desirable to be wound on the typewriter spool.

Block $a$ and bar $b$ afford a bearing for the shafts of a gear wheel $m$ and a pinion $n$. On the shaft of gear $m$ is a handle $l$. On the shaft of pinion $n$ is a disc $o$ on which a spool $y$ is adapted to be laid. Spool $y$ is the spool which is to be applied to the typewriter.

Secured to the under face of bar $h$ is a block $p$ on which is revolubly mounted a cone $r$ adapted to extend into the axial hole in spool $y$ and thereby hold the spool on disc $o$ and also properly position it thereon.

Secured to the front end of plate $i$ is a guide post $s$, which may be fixed, or may turn on its axis like a roller. Projecting laterally from block $a$ is a plate $v$ in which is turnably mounted an upstanding roller $t$.

Figure 1:
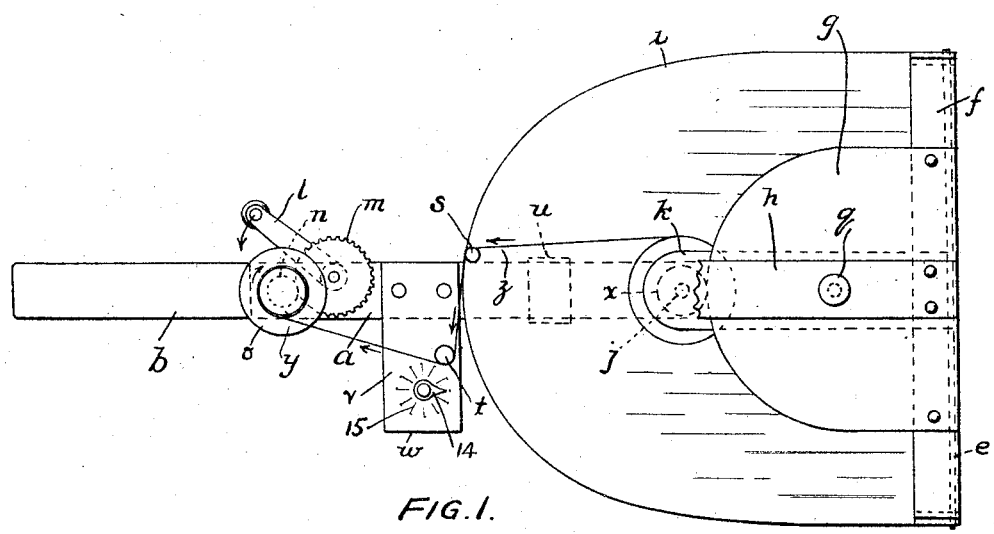
Fig. 1 is a plan view of a machine embodying my invention, the upper swingable frame being partly broken away.
Figure 2:
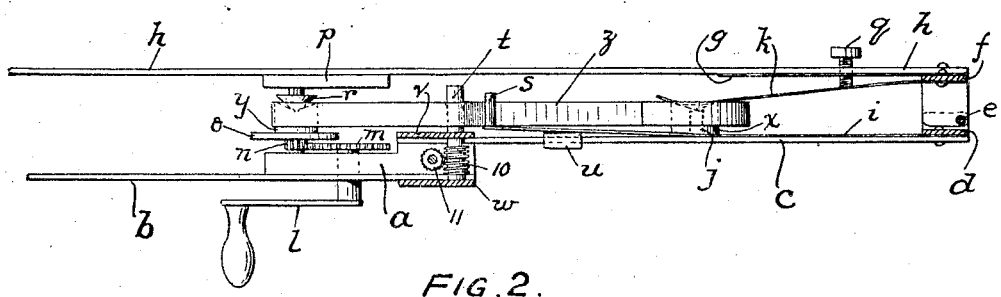
Fig. 2 is a side view, partly in section, of the same.
Figure 3:
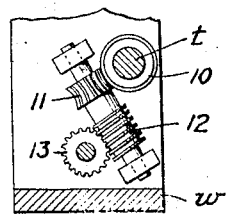
Fig. 3 is a detail view of part of the measuring device.

The operation of the machine, so far as it has been described, is as follows:

The end of the ribbon $z$ is unreeled from spool $j$ by hand and passed successively about post $s$ and roller $t$ and secured to spool $y$, which is deposited on disc $o$. Frame $f$, $g$, $h$ has been previously lifted on its rear axis to allow the above manipulation. Frame $f$, $g$, $h$ is now moved into its closed position, as shown in Fig. 2, in which position cone $r$ engages spool $y$ and tongue $k$ engages spool $x$. The operator grasps with one hand the ends of bars $b$ and $h$ and thereby holds the frames in their closed relation. By turning handle $l$ with the other hand, gear *m*, pinion *n*, spool *y* and cone *r* are rotated and the desired length of ribbon *z* is rapidly wound on spool *y*. The ribbon on spool *y* is then severed from the ribbon on the main reel, frame *f*, *g*, *h* is lifted, and ribbon *y* removed.

Typewriter ribbon spools are of different constructions, and when such different makes of spools are applied to disc *o*, their ribbon-receiving peripheries will be at variable distances from disc *o*. Unless, however, the lower edge of the periphery of spool *y* is on a level with the edge of the reel-holding plate *i* (with which the edge of the ribbon contacts as it feeds from the reel), the ribbon will not wind properly on the spool. I have provided a very simple means for insuring the proper relative positions of plate *i* and spool *y*. Plate *i* is secured only at its rear end, and is vertically swingable on its secured end by reason of its inherent flexibility. Sleeved on the bar *c* beneath the plate *i* is a band *u* which is slidable along the bar and has a cam action on plate *i* tilting up its free end to progressively greater heights as the band is moved toward spool *x*. Thereby, the edge of plate *i* can be positioned in such relationship to spool *y* that the ribbon will approach spool *y* along a plane precisely aligning and tangential with the ribbon-receiving circumference of the spool. When band or cam *u* is once properly adjusted for a given make of spool, it may be fixed in its adjusted position.

Plate *v* forms the top of a box *w*, in the bottom of which, as well as in the top, roller *t* is adapted to turn on its axis. Roller *t* carries a worm 10, which engages a worm wheel 11 on a lateral shaft, which carries a worm 12, which engages a worm wheel 13 on a vertical shaft, which extends up through plate *v* and carries a pointer 14 registering with a dial 15 on the top of plate *v*. As the ribbon *z* is unreeled from spool *x* and wound on spool *y*, the rapid rotation of roller *u* imparts, through the described reduction gearing, a slow turning movement to the pointer shaft. There may be, for example, twelve radial marks on the dial, and the gearing ratio may be such that for each yard of ribbon that is unreeled, the pointer will turn from one mark to another, until, after twelve yards of ribbon have been unreeled (which is the capacity of an ordinary typewriter spool), the pointer will have made a complete revolution. Thereby the operator can determine, without careful observation of the typewriter spool, and by a mere glance at the indicator, when to stop the unreeling operation.

Having now fully described my invention, what I claim and desire to protect by Letters Patent is:

1. A ribbon unreeling and spool-winding machine comprising two frames, means carried by the two frames to revolubly hold between them a reel of ribbon and a spool to be wound, and mechanism to revolve the spool to be wound, one of said frames being hinged on, and adapted to be swung toward, the other frame to bring them into relation to so hold said reel and spool.

2. A ribbon unreeling and spool-winding machine comprising two frames, means carried by the two frames to revolubly hold between them a reel of ribbon and a spool to be wound, and mechanism to revolve the spool to be wound, one of said frames being hinged on, and adapted to be swung toward, the other frame to bring them into relation to so hold said reel and spool, said frames having prolongations adapted, when the frames are in said closed relationship, to be grasped by one hand so that the parts of the machine may be maintained in operative relationship while the spool-revolving mechanism is operated by the other hand.

3. A ribbon unreeling and spool-winding machine comprising two frames, reel-supporting means and spool-supporting means on one frame, mechanism to revolve the spool to be wound, ribbon guides between the reel-supporting means and the spool-supporting means, the said frames being in hinged relation, and spool-holding and positioning means carried by the second frame and adapted to engage the spool when one frame is swung toward the other.

4. A ribbon unreeling and spool-winding machine comprising two frames, spool-supporting means on one frame, mechanism to revolve said spool, the other frame being hinged on the first frame, a spool-holding and positioning cone freely revoluble on the second frame and adapted to engage the spool when the frames are swung one toward another, and means on one of the frames to hold a reel of ribbon to be unwound.

5. A ribbon unreeling and spool-winding machine comprising a frame, receiving spool-supporting means thereon, a flexible plate mounted thereon and having a free end, a reel holder mounted on said plate, means to rotate the ribbon-receiving spool, the ribbon being adapted to feed from the reel to the spool over the free edge of said plate, and means to adjust the free edge of the plate in order to predetermine the path of travel of the ribbon as it approaches the receiving spool.

6. A ribbon unreeling and spool-winding machine comprising a frame, receiving spool-supporting means thereon, a flexible plate mounted thereon and having a free end, a reel holder mounted on said plate, means to rotate the ribbon-receiving spool, the ribbon being adapted to feed from the reel to the spool over the free edge of said plate, said frame comprising a bar, and a cam slidable on the bar and adapted to engage the free end of the plate and lift it to different levels.

7. A ribbon unreeling and spool-winding machine comprising two frames, one swingable on the other, means carried by the two frames to revolubly hold between them the spool to be wound, a reel holder carried by one frame, and a flexible tongue carried by the other frame and adapted, when the frames are swung toward one another, to yieldingly engage the reel holder and hold it in the desired operative position.

In testimony of which invention, I have hereunto set my hand at Philadelphia, Penna., on this 30th day of April, 1925.

EBER BURROUGH.